INVENTOR
ROSEWELL W. GILBERT
BY
Curtis, Morris & Safford
ATTORNEYS.

INVENTOR
ROSEWELL W. GILBERT
BY
Curtis, Morris & Safford
ATTORNEYS.

United States Patent Office 3,423,757 Patented Jan. 21, 1969

3,423,757

ELECTRICAL SIGNAL RADIATING APPARATUS

Roswell W. Gilbert, New York, N.Y., assignor to Dictaphone Corporation, Bridgeport, Conn.

Filed May 5, 1966, Ser. No. 547,856
U.S. Cl. 343—788 14 Claims
Int. Cl. H01q 7/08

The present invention relates, in general, to electrical signal radiating systems and, in particular, to a multiple antenna array for a multi-channel, short-range, wireless (in contrast to "wired") communications systems such as might be used in a single building, an auditorium, a classroom or the like.

At the present time, much effort is being devoted to the development of electronic classroom instructional aids. For example, multi-channel, wireless communications systems are being adapted for classroom operation to permit a number of students to tune selectively individual receivers to listen to one or more programmed lessons being transmitted simultaneously from a main transmitter. While one student may be listening to a lesson dealing with mathematics being transmitted on one frequency, his neighbor may be listening to a lesson dealing with history being transmitted on another frequency.

Another potential widespread use of multi-channel, wireless communications systems is in simultaneous translation systems for meetings of international organizations such as the United Nations. People sitting alongside each other, unable to understand the language of a speaker, may listen simultaneously to translations in their native tongues being transmitted on different frequencies of a multi-channel, wireless communications system. Further it is apparent that multi-channel, wireless systems have potential application in many other situations where a number of listeners, located in close proximity to one another as, for example, in the same room or auditorium, are to listen simultaneously to transmissions of different information. The widespread use, popularity and potential application of such wireless systems undoubtedly is due to the ease with which complete systems or units of a system may be transported and relocated, thus rendering these systems considerably more flexible and versatile than comparable wired systems.

Multi-channel, wireless systems, in general, may be arranged to employ either a single broadband antenna which operates to radiate simultaneously a plurality of signals, or a plurality of separate antennas which individually radiate different signals. The problems incident to the design and construction of a communications system employing a single broadband antenna are well known to those skilled in the art. Generally, these problems pertain to the coupling between channels in the transmitter and the power losses in the multiple hybrid coupler usually used between the final amplifier/modulators and the broadband antenna.

Separate antennas, one for each channel, normally exhibit a certain degree of intercoupling when located relatively close to one another. This also results in intermodulation within the final amplifier/modulators to which the antennas are connected. Nevertheless, separate antennas, however close to one another, provide at least some decoupling between channels which renders an array of separate antennas, generally, more desirable than a single broadband antenna. Loopstick antennas (loop antennas having magnetic cores) may be employed advantageously in such an array and are particularly desirable because they require few components and may be fabricated at relatively low cost.

The greater the physical spacing between the antennas in such an array and the greater the differences in channel frequencies, the less the coupling between separate antennas. Practical considerations, however, limit the physical spacing between separate antennas for multi-channel systems such as the ones under consideration. The transmitters and receivers which comprise these systems preferably should be compact and easily movable from location to location. It follows, that the antenna arrays also should be compact and of simple configuration.

Practical considerations also limit the separation of the channel frequencies used in multi-channel systems of the type in question. It is preferable to operate these systems in the Federal Communications Commission "alternative band" of 160–190 kc./s. because the governmental regulations covering operation in this band are more liberal than the regulations governing operation at other frequencies. For example, no field strength measurements are required for operating in the "alternative band." Instead, a limitation of one watt input to the final amplifier is imposed. However, transmission problems are likely to arise as a result of close channel packing when a multi-channel system is operated in the "alternative band." In a four channel system, for example, operating in the "alternative band," the separation of channel frequencies may be close to the desired audio sideband capability and intermodulation within the transmitter may become critical in terms of suprious radiation and audible intermodulation products. Furthermore, additional channels increase the problem of inter-modulation.

Accordingly, it is an object of the present invention to provide a new and improved antenna array arrangement for multi-channel, wireless communications systems.

It is another object of the present invention to provide such an array in which the individual radiating elements are loopstick antennas.

It is a further object of the present invention to provide a loopstick antenna array in which compensation is provided for the normal intercoupling between different antennas in the array.

It is yet another object of the present invention to provide a loopstick antenna array of compact configuration.

It is still another object of the present invention to provide a loopstick antenna array for multi-channel, wireless communications systems which permits simple handling, transporting and installing of such systems.

It is a still further object of the present invention to provide a loopstick antenna array which is relatively simple in construction and inexpensive to fabricate.

Briefly stated, the foregoing objects are achieved by physically positioning antennas in an array within the constraints imposed by the application in question and coupling together pairs of antennas between which there is mutual inductance, this coupling being in opposition to the mutual inductance. As a result, pairs of antennas in the array are decoupled and mutual inductance between antennas is neutralized.

For a better understanding of the present invention, together with other and further objects thereof, reference is made to the following description, taken in connection with the accompanying drawings, and its scope will be delineated in the appended claims.

Referring to the drawings.

Figure 1:
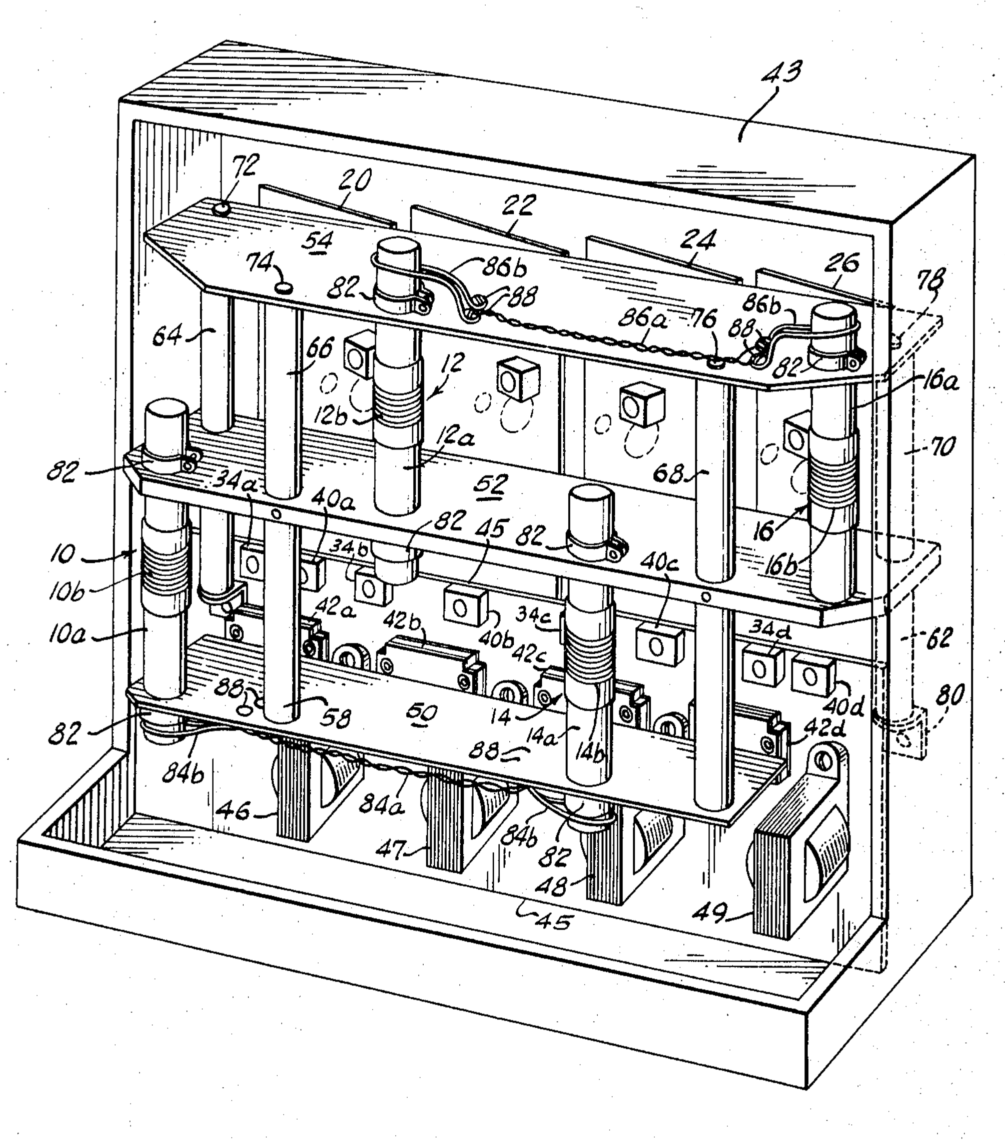
FIGURE 1 is a perspective view of one embodiment of a loopstick antenna array constructed in accordance with the present invention.

Referring to FIGURE 1, one embodiment of a loopstick antenna array constructed in accordance with the present invention includes a plurality of loopstick antennas 10, 12, 14 and 16 disposed vertically and parallel to each other in a staggered pattern with adjacent antennas diagonally offset and alternate antennas aligned. These loopstick antennas may be of conventional construction and operation with each having a ferrite rod (10*a*, 12*a*, 14*a* and 16*a*, respectively) around which is wound a coil (10*b*, 12*b*, 14*b* and 16*b*, respectively).

The loopstick antennas 10, 12, 14 and 16 are adapted to be coupled individually to four transmitters which may be of conventional design and operation. Each transmitter is composed of a printed circuit board (20, 22, 24 and 26) located behind one of the antennas in the antenna array, and a reactor (46, 47, 48 and 49) mounted on a support surface 45 below the antenna array. The reactors 46, 47, 48 and 49 are transmitter modulation inductors which are illustrated as being too large to be accommodated on the printed circuit boards 20, 22, 24 and 26. This arrangement of the components also results in a compact unit which may be transported and installed for use with ease. The printed circuit boards 20, 22, 24 and 26 and the support surface 45 are held in place within a carrying case 43 by suitable means which are not shown.

Figure 4:
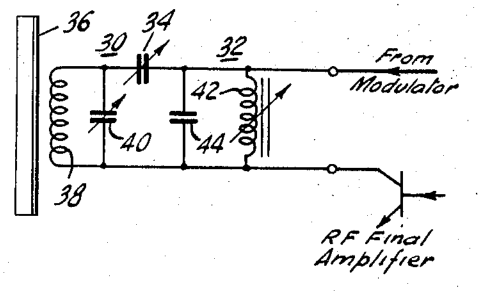
FIGURE 4 is a schematic diagram of a loopstick antenna and its associated circuitry.

FIGURE 4, which is a schematic diagram of a conventional loopstick antenna and its associated circuitry, indicates the manner in which a loopstick antenna may be coupled to the output of a transmitter. An antenna tank circuit 30 and a coupling tank circuit 32 are coupled together by a variable capacitor 34 to form a double-tuned circuit. The antenna tank circuit 30 includes the loopstick 36 of ferrite, for example, the antenna coil 38 and a variable capacitor 40. The coupling tank circuit 32 includes a variable iron core inductor 42 and a capacitor 44. The modulator of the transmitter is connected to one terminal of the coupling tank circuit 32, while the RF final amplifier of the transmitter is connected to the other terminal of the coupling tank circuit.

The variable capacitors 34 and 40 and the variable inductor 42 serve to resonate the load impedance presented to the transmitter and adjust the passband of the antenna circuit. The particular arrangement illustrated permits the settings of these factors to be made independent of each other.

Referring again to FIGURE 1, the variable capacitors 34 and 40 of each of the loopstick antenna circuits, indicated by reference numerals 34*a*–34*d* and 40*a*–40*d*, are mounted on the support surface 45 behind the loopstick antenna array. The variable inductors 42 of each of the loopstick antenna circuits, indicated by reference numerals 42*a*–42*d*, also are mounted on the support surface 45 behind the antenna array. The actual connections between the antenna coils 10*b*, 12*b*, 14*b* and 16*b* and the associated antenna circuit components have been omitted from FIGURE 1 for the sake of clarity.

The loopstick antennas 10, 12, 14 and 16 are held in place by three support panels 50, 52 and 54 having a first set of aligned holes through which the loopsticks are passed. The support panels 50, 52 and 54 are of insulating material, for example, of phenolic material laminate, so that the loopstick antennas are electrically isolated from one another. The support panels 50, 52 and 54 are held apart by a plurality of tubular spacers. In particular, panels 50 and 52 are held apart by tubular spacers 58 and 60, while panels 52 and 54 are held apart by tubular spacers 64, 66, 68 and 70. Four rods 72, 74, 76 and 78 pass through the tubular spacers and a second set of aligned holes in the support panels 50, 52 and 54. The upper ends of the rods 74 and 76 are provided with enlarged heads which bear against the upper surface of panel 54, while the lower ends of these rods are threaded to receive nuts (not shown) which bear against the underside of panel 50 as these nuts are turned onto the threaded lower ends of these rods.

The loopstick antenna array is held in place within the carrying case 43 by means of its attachment to a pair of brackets 80 which extend outward from the support surface 45. Two additional tubular spacers 56 and 62 rest upon the pair of brackets 80. Rods 72 and 78, similar to rods 74 and 76 except that rods 72 and 78 are slightly shorter, pass through pairs of tubular spacers 64, 56 and 70, 62, respectively, the corresponding holes in panels 52 and 54, and holes in the brackets 80. The threaded lower ends of rods 72 and 78 project through the holes in the brackets and receive nuts (not shown) which bear against the undersides of the brackets as the nuts are turned onto the threaded lower ends of these rods.

The holes in panels 50, 52 and 54, through which the loopstick antennas 10, 12, 14 and 16 are passed, are oversized to permit upward and downward adjustments in the vertical positions of the loopsticks. Once the desired positions of the loopsticks are achieved, the loopsticks are held in place by collar clamps 82. The purpose of such adjustments in the vertical positions of the loopstick now will be explained.

Figure 2:
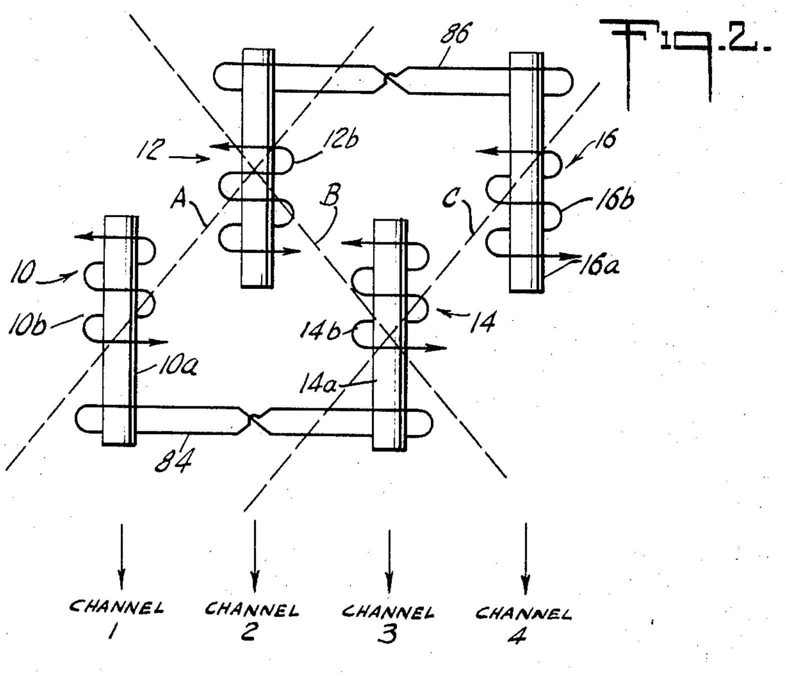
FIGURE 2 is a schematic diagram of the loopstick antenna array shown in FIGURE 1.

As previously indicated, separate loopstick antennas radiating signals of approximately the same frequency and located relatively close to one another normally exhibit a certain degree of intercoupling. As the horizontal spacing of vertically disposed antennas is increased, the intercoupling is decreased. Two antennas, for example, 4½" long and radiating signals in the "alternative band," are substantially decoupled when spaced a few feet apart. Such antenna spacing, particularly for a system having more than two channels, results in a very large antenna array not readily movable or easy to install. However, as vertically disposed loopstick antennas are moved along their longitudinal axes, a condition at which the intercoupling is zero may be reached after relatively short movements of the antennas. Zero intercoupling for two 4½" long antennas having a horizontal separation of approximately 3" may be achieved after the centers of the two antennas have been spaced apart approximately 3". FIGURE 2, which is a schematic diagram of the loopstick antenna array of FIGURE 1, is intended to depict such conditions of zero coupling between adjacent antennas in the array. Elements in FIGURE 2 corresponding to elements in FIGURE 1 have given the same reference numerals. The antennas in the array are seen to be in a staggered pattern after the positions of adjacent antennas have been shifted upward and downward to achieve the conditions of zero intercoupling. The dotted lines A, B and C in FIGURE 2 passing through the centers of adjacent antennas correspond to the angles of zero coupling. The points of proper adjustment may be determined by energizing pairs of adjacent antennas sequentially and observing with an oscilloscope, for example, the disappearance of the intermodulation products as the antennas being tested are moved upward and downward.

Although adjacent antennas in the array of FIGURES 1 and 2 are decoupled due to the differences in their relative heights, the array still may be subject to mutual inductance between alternate antennas. Whether this condition exists and, if so, to what degree, is dependent upon the frequency separation between signals being radiated by alternate antennas and the physical spacing of alternate antennas. Any mutual inductance between alternate antennas, however, is less than the mutual inductance between adjacent antennas prior to adjustment because of the greater physical spacing between alternate antennas.

To compensate for mutual inductance between alternate antennas, wire coupling loops 84 and 86 are provided to couple together alternate antennas in the manner indicated in FIGURE 2. In particular, the wire coupling loops 84 and 86 are arranged in figure 8 patterns so that alternate antennas are coupled together in opposition to any mutual inductance between coupled antennas. By providing means for adjusting the amount of coupling between alternate antennas, the mutual inductance between alternate antennas may be neutralized.

Referring again to FIGURE 1, the wire coupling loops between alternate antennas in the array include central lengths 84*a* and 86*a* and end portions 84*b* and 86*b*. The central lengths 84*a* and 86*a* are connected to the respective end portions 84*b* and 86*b* at terminals 88. The central lengths are twisted one or more odd number of times to provide the cross-coupling between coupled antennas.

The amount of coupling provided by the coupling loops may be varied by moving the end portions 84*b* and 86*b* upward and downward around the coupled antennas in a direction parallel to the longitudinal axes of the antennas. Such movements of the end portions of the coupling loops change the amount of magnetic flux within the end portions and, therefore, the coupling between antennas due to the coupling loops. The points of proper adjustment may be determined by energizing one pair of alternate antennas at a time and observing with an oscilloscope the disappearance of the modulation products as the end portions of the coupling loops are moved. The end portions of the coupling loops preferably are made of a heavier gage wire so that they will maintain the positions to which they are moved as the coupling between antennas is being set. The end portions 84*b* and 86*b* also may be held in place around the antennas by an adhesive tape.

Figure 3:
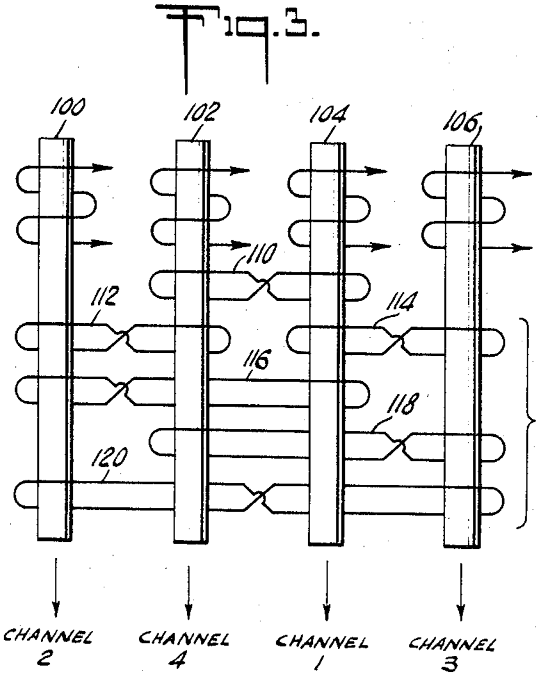
FIGURE 3 is a schematic diagram of a second embodiment of a loopstick antenna array constructed in accordance with the present invention.

FIGURE 3 is a schematic diagram of a second embodiment of a loopstick antenna array constructed in accordance with the present invention. In this embodiment, four loopstick antennas 100, 102, 104 and 106 are positioned along side one another all in a line, in contrast to the embodiment of FIGURES 1 and 2 in which adjacent antennas are diagonally offset. Because of the "in-line" arrangement of the array of FIGURE 3, substantial mutual inductance will exist between all of the antennas. In general, the number of coupling paths ($n$) between any number of antennas (N) is:

$$n=\frac{N(N-1)}{2}$$

Thus, for the array in FIGURE 3, there are six coupling paths so that six coupling loops 110, 112, 114, 116, 118 and 120 are provided. The coupling loops in the FIGURE 3 array also are arranged in figure 8 patterns to result in antennas being cross-coupled in opposition to any mutual inductance between coupled antennas. The physical arrangement of components in the antenna array in FIGURE 3 may be generally similar to the apparatus of FIGURE 1 except for the alignment of the antennas and the number of coupling loops. The amount of coupling provided by the coupling loops again may be varied by moving the end portions upward or downward along the longitudinal axes of the antennas.

To further minimize the intercoupling between pairs of antennas in either of the arrays described above, the transmitters may be coupled to the antennas in such a manner as to provide the greatest frequency differences between antennas exhibiting intercoupling. Assuming operation in the FCC "alternative band," typical frequencies of operation might be:

| Channel: | Frequency, kc./s. |
|---|---|
| 1 | 163.75 |
| 2 | 171.25 |
| 3 | 178.75 |
| 4 | 186.25 |

For the array shown in FIGURES 1 and 2, the order of frequencies is indicated in FIGURE 2 as being sequential with antenna 10 radiating the channel-1 signal, antenna 12 radiating the channel-2 signal, antenna 14 radiating the channel-3 signal and antenna 16 radiating the channel-4 signal. For this arrangement, the pairs of alternate antennas are separated by two channel frequencies.

For the array shown in FIGURE 3, the order of frequencies is indicated as being interlaced with antenna 100 radiating the channel-2 signal, antenna 102 radiating the channel-4 signal, antenna 104 radiating the channel-1 signal and antenna 106 radiating the channel-3 signal. For this arrangement, the pairs of adjacent antennas are separated by at least two channel frequencies.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:

1. A loopstick antenna array comprising:

a plurality of loopstick antennas adapted to be coupled individually to a plurality of transmitters and disposed in a staggered pattern with adjacent loopstick antennas diagonally offset and alternate antennas aligned;

and a plurality of wire coupling loops, one for each pair of alternate loopstick antennas, for coupling together said pairs of alternate loopstick antennas, each of said wire coupling loops being in a figure 8 pattern to couple together a pair of alternate loopstick antennas in opposition to any mutual inductance between said coupled antennas.

2. A loopstick antenna array according to claim 1 wherein the loopstick antennas are disposed vertically and parallel to each other.

3. A loopstick antenna array comprising:

a plurality of loopstick antennas adapted to be couplec individually to a plurality of transmitters;

and coupling means between pairs of said loopstick antennas between which there is mutual inductance for coupling together said pairs of said loopstick antennas in opposition to said mutual inductance.

4. A loopstick antenna array according to claim 3 wherein the coupling means include loops of wire passing around the coupled loopstick antennas.

5. A loopstick antenna array comprising:

a plurality of loopstick antennas adapted to be couplec individually to a plurality of transmitters;

and a plurality of single-turn wire coupling loops running between pairs of said loopstick antennas betwee which there is mutual inductance for coupling to gether said pairs of said loopstick antennas in oppo sition to said mutual inductance to neutralize sai mutual inductance.

6. A loopstick antenna array according to claim wherein the single-turn loops are arranged in figure patterns.

7. A loopstick antenna array according to claim wherein the wire coupling loops are movable along th longitudinal axes of the loopstick antennas to vary th amount of coupling between coupled pairs of said loop stick antennas.

8. A loopstick antenna array according to claim wherein the loopstick antennas are positioned so th adjacent loopstick antennas are diagonally offset.

9. A loopstick antenna array according to claim wherein adjacent loopstick antennas are so positioned th there is zero mutual inductance between adjacent loo stick antennas.

10. A loopstick antenna array according to claim wherein the loopstick antennas are positioned alongsi one another all in a line.

11. A loopstick antenna array comprising:

a plurality of loopstick antennas adapted to be coupl individually to a plurality of transmitters and pos tioned side by side in close proximity to each oth with all said loopstick antennas in a line;

and a plurality of wire coupling loops, one for ea possible pair of loopstick antennas, for coupling t gether said pairs of loopstick antennas, each of said wire coupling loops being in a figure 8 pattern to couple together a pair of loopstick antennas in opposition to said mutual inductance between said coupled antennas.

12. A loopstick antenna array according to claim 11 wherein the loopstick antennas are disposed vertically and parallel to each other.

13. A compact loopstick antenna array comprising:

a plurality of loopstick antennas adapted to be coupled individually to a plurality of transmitters and positioned in close proximity to each other with adjacent loopstick antennas diagonally offset and alternate loopstick antennas aligned;

and a plurality of single-turn wire coupling loops, one for each pair of alternate loopstick antennas, for coupling together said pairs of alternate loopstick antennas, each of said wire coupling loops being in a figure 8 pattern to couple together a pair of alternate loopstick antennas in opposition to any mutual inductance between said coupled antennas to neutralize said mutual inductance.

14. An antenna array comprising:

a plurality of radiating elements adapted to be coupled individually to a plurality of transmitters and disposed in a staggered pattern with adjacent radiating elements diagonally offset and alternate radiating elements aligned;

and coupling means between pairs of said alternate radiating elements between which there is mutual inductance for coupling together said pairs of alternate radiating elements in opposition to said mutual inductance.

References Cited

UNITED STATES PATENTS 3,078,348 2/1963 McIntosh ------- 343—788 XR

HERMAN KARL SAALBACH, *Primary Examiner.*

M. NUSSBAUM, *Assistant Examiner.*

U.S. Cl. X.R.

179—82; 343—702, 844, 854